(No Model.) 2 Sheets—Sheet 2.
E. BAUSCH.
INVERTIBLE MICROSCOPE.
No. 373,634. Patented Nov. 22, 1887.
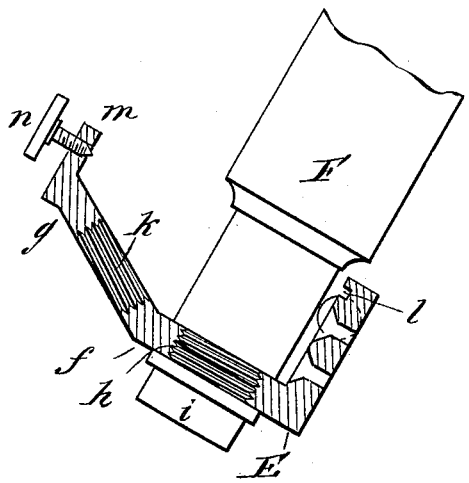
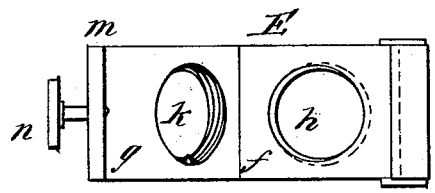
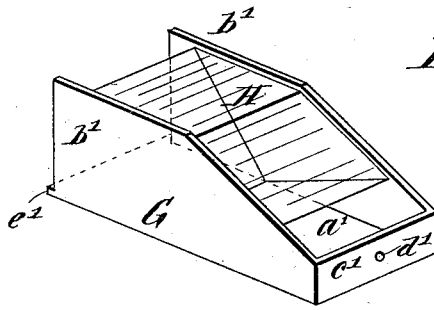
WITNESSES:
INVENTOR:
E. Bausch
BY Munn &Co
ATTORNEYS.

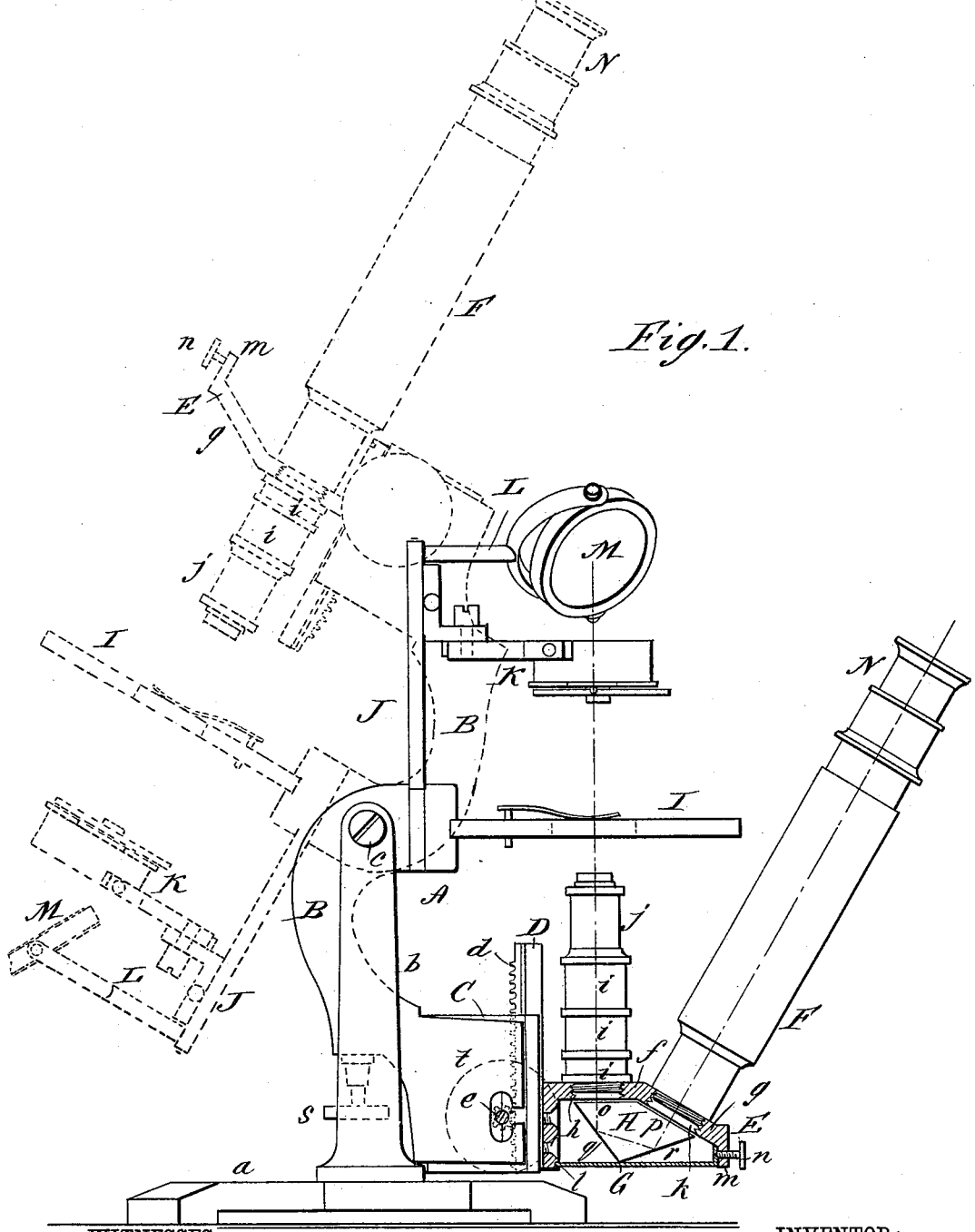

UNITED STATES PATENT OFFICE.

EDWARD BAUSCH, OF ROCHESTER, NEW YORK.

INVERTIBLE MICROSCOPE.

SPECIFICATION forming part of Letters Patent No. 373,634, dated November 22, 1887.

Application filed March 25, 1887. Serial No. 232,383. (No model.)

*To all whom it may concern:*

Be it known that I, EDWARD BAUSCH, of Rochester, in the county of Monroe and State of New York, have invented a new and Improved Invertible Microscope, of which the following is a specification, reference being had to the annexed drawings, forming a part thereof, in which—

Figure 1 is a side elevation of my improved invertible microscope, showing the microscope in two positions. Fig. 2 is an enlarged transverse section of the microscope nose-piece and arm. Fig. 3 is a plan view of the arm, and Fig. 4 is a perspective view of the prism and prism-case.

Similar letters of reference indicate corresponding parts in all the views.

Invertible microscopes which will enable the observer to view the under side of an object are common and well known, but such instruments are incapable of being used for observing the upper surface of objects.

The object of my invention is to produce a microscope which may be employed either as an invertible or vertical microscope without any material change in the adjustment.

My invention consists in a microscope-stand provided with an arm adapted to receive a a doubly-reflecting prism, the said arm being arranged to hold the main tube in two positions, also to receive and hold the prism, all as hereinafter more fully described.

The foot $a$ of the stand A is provided with two columns, $b$, between which is pivoted the arm B upon the axis $c$. The arm B contains a guide, C, supported on springs and adapted to receive the slide D, and to the slide D is secured a rack, $d$, which is engaged by a pinion on the shaft $e$ as ordinarily arranged.

To the slide D is secured an arm, E, having the right-angled portion $f$ with the extremity $g$ arranged at an angle of one hundred and fifty degrees with the part $f$. In the part $f$ is formed a threaded hole, $h$, fitted to receive the adapter $i$ or the objective $j$. In the part $g$ of the arm is formed a threaded hole, $k$, adapted to receive the threaded end of the draw-tube F. In the part of the arm E adjoining the slide D is formed a groove, $l$, and in a lip, $m$, upon the end of the arm E is fitted a screw, $n$.

The prism-box G (which is preferably made of sheet metal) is provided with a bottom piece, $a'$, and side pieces, $b'$, arranged at right angles to the bottom piece, and cut away upon their free edges to correspond to the angle of the prism and to the angle of the arm E. The side pieces, $b'$, are joined to a front piece, $c'$, also connected with the bottom and provided with an indentation, $d'$, for receiving the fastening-screw $n$. The rear end of the bottom piece, $a'$, projects beyond the sides of the prism-box, forming a lip, $e'$, which fits in the groove $l$ in the arm E.

To the box G is fitted a prism, H, having sides $o$ $p$, which are at right angles to the axes of the objective $j$ and of the tube F, and which form with each other an angle of one hundred and fifty degrees. The sides $q$ $r$ of the prism are arranged at an angle of one hundred and five degrees with each other, the angle formed with the axes of the objective and tube being the angle at which total reflection is secured. The angle between the sides $p$ $r$ of the prism is forty-eight degrees, and the angle between the sides $o$ $q$ of the prism is fifty-seven degrees.

To the arm B, opposite the pivotal screws $c$, is secured a stage, I, and upon the arm adjoining the stage is journaled the mirror-arm J, carrying the sub-stage K and the mirror-bar L, which supports the mirror M.

When the microscope is used as an inverted microscope, the objects are arranged as shown in full lines in Fig. 1—that is, the arm B is turned downward between the standards $b$, and the objective $j$, prism H, and draw-tube F are in the position just described. The fine adjustment-screw $s$ is between the standards $b$, but easy of access. The tube F receives in its upper end an eye-piece, N, of the usual description. The ray of light reflected from the mirror M passes vertically downward through the stage, through the objective, and through the face $o$ of the prism H, and strikes the surface $q$ and is reflected to the surface $r$, and by the surface $r$ is reflected upward obliquely parallel with the axis of the tube F through the eye-piece N. The objective $j$ is focused by turning the shaft $e$ by means of the milled wheel $t$ or by means of the fine adjustment-screw $s$. By means of this arrangement objects such as crystallizing solutions of salts, liquids depositing sediments, and other objects which require examination from the under surface may be viewed to the best advantage.

When it is desired to use the microscope as a vertical microscope for ordinary purposes, the main tube F is unscrewed from the arm E, the prism-box G, with its prism H, is removed from the arm after loosening the screw $n$, and the arm B is turned above its pivotal screws $c$ in a vertical or inclined position, when the tube F is screwed into the upper half of the hole $h$ in the arm E immediately above the objective $j$, so as to be axially in line with the objective and the stage, as indicated in dotted lines in Fig. 1.

This form of instrument is particularly adapted for chemical investigations, as the crystals may be studied as they lie in a natural position in any depth of fluid, and the head of the observer is removed sufficiently from the stage to prevent the inhalation of fumes. It is also valuable in the examination of diatomaceæ and other objects in water which tend to sink to the bottom. It is also efficient in the examination of most histological preparations, as they adhere to the surface of the slide, and are therefore rendered perfectly plain on their under surfaces. It also serves as a dissecting-microscope.

Having thus fully described my invention, I claim as new and desire to secure by Letters Patent—

1. In an invertible microscope, the combination, with the tube-supporting arm, of an angled arm adapted to support the main tube of the microscope in either of the two positions in which it is used, and a double reflector adapted to receive the light from the object and reflect it through the main tube, substantially as described.

2. In an invertible microscope, the combination of the foot $a$, provided with the standards $b$, the arm B, pivoted between the standards $b$, the stage I, having opposite sides adapted for supporting the object to be examined, the adjusting-rack $d$, the angled arm E, provided with the threaded openings $h\ k$, the objective $j$, the main tube F, the prism H, adapted to receive the beam of light from the microscope-objective and reflect it through the main tube F, and the removable prism-box G, arranged to hold the prism H in the position of use, substantially as described.

3. The combination, with the objective $j$ and main tube F, of the angled arm E, having threaded holes $h\ k$, adapted to hold the objective and the tube in proper relation to each other, the threaded hole $h$ being arranged to receive both the objective and the main tube when the instrument is employed as a vertical microscope, substantially as described.

4. The combination, with the objective $j$ and the main tube F, of the angled arm E, provided with the groove $l$ and binding-screw $n$, the prism H, prism-box G, provided with a lip adapted to enter the groove $l$ and having an indentation for receiving the end of the screw $n$, substantially as described.

EDWARD BAUSCH.

Witnesses:
 GEO. M. HOPKINS,
 C. SEDGWICK.